United States Patent [19]
Gierer et al.

[11] Patent Number: 6,011,331
[45] Date of Patent: *Jan. 4, 2000

[54] ELECTRIC MOTOR HAVING AN IMPROVED AIRFLOW COOLING SYSTEM

[75] Inventors: Joseph T. Gierer, Glen Carbon, Ill.; Karmen D. Cox, St. Peters, Mo.

[73] Assignee: Emerson Electric Co., St. Louis, Mo.

[*] Notice: This patent issued on a continued prosecution application filed under 37 CFR 1.53(d), and is subject to the twenty year patent term provisions of 35 U.S.C. 154(a)(2).

[21] Appl. No.: 08/837,777

[22] Filed: Apr. 22, 1997

[51] Int. Cl.[7] .............................. H02K 9/04; H02K 9/06
[52] U.S. Cl. ..................... 310/58; 310/52; 310/60 R; 310/62; 310/63; 310/DIG. 6; 310/68 B
[58] Field of Search ................... 310/62, 63, 58, 310/59, 68 B, 60 R, 52, DIG. 6; 417/423.7, 424.2, 410.1

[56] References Cited

U.S. PATENT DOCUMENTS

| | | | |
|---|---|---|---|
| 4,164,690 | 8/1979 | Mueller et al. | 318/254 |
| 4,620,139 | 10/1986 | Egami et al. | 310/62 |
| 4,662,830 | 5/1987 | Pottebaum | 417/424 |
| 4,773,829 | 9/1988 | Vettori | 310/68 R |
| 4,839,547 | 6/1989 | Lordo et al. | 310/60 A |
| 4,958,115 | 9/1990 | Miller | 310/12 |
| 5,081,384 | 1/1992 | Rausch | 310/63 |
| 5,124,600 | 6/1992 | Hedeen | 310/51 |
| 5,152,676 | 10/1992 | Ohi | 417/354 |
| 5,176,509 | 1/1993 | Schmider et al. | 417/423.7 |
| 5,196,747 | 3/1993 | Kress et al. | 310/89 |
| 5,532,533 | 7/1996 | Mizutani et al. | 310/68 B |

FOREIGN PATENT DOCUMENTS

| | | | |
|---|---|---|---|
| 345796 | 12/1989 | European Pat. Off. | H02K 7/14 |
| 6-38452 | 2/1994 | Japan | H02K 7/14 |

OTHER PUBLICATIONS

Japanese Abstract 08–289505A, Ogake et al., Nov. 1, 1996.
Japanese Abstract 08–275483, Sugiyama et al., Oct. 18, 199.

*Primary Examiner*—Nestor Ramirez
*Assistant Examiner*—Burton S. Mullins
*Attorney, Agent, or Firm*—Arnold White & Durkee; Mark L. Gleason

[57] ABSTRACT

An improved design for a switched reluctance motor is disclosed that keeps the motor cool during operation and thereby improves the performance and reliability of the motor. The improved design employs three centrifugal fans mounted to the motor shaft, which are used to create two independent airflow paths, one of which cools the electronic components of the motor. The improved design also divides the functions performed by a single printed circuit board into two circuit boards, an upper circuit board and a lower circuit board. Another feature of the improved design includes locating the position/speed sensing encoder immediately below one of the centrifugal cooling fans. The disclosed construction provides for increased dissipation of heat that is generated by the motor and its electronic components. In this configuration, the printed circuit boards and other electronic components are located in such a manner that air can be circulated in a path to remove heat from these components.

24 Claims, 5 Drawing Sheets

ELECTRIC MOTOR HAVING AN IMPROVED AIRFLOW COOLING SYSTEM

FIELD OF THE INVENTION

The present invention relates generally to switched reluctance motors, and more particularly to an improved structure for cooling switched reluctance motors and other electronically commutated motors.

BACKGROUND OF THE INVENTION

Conventional switched reluctance motors are provided with a rotary position encoder that monitors the position and speed of the rotor. The rotary position encoder is mounted on the motor shaft and typically disposed in proximity to a printed circuit board that controls the motor. The printed circuit board has conventionally been mounted on top of the motor with the motor shaft extending through an opening in the printed circuit board. A drawback of the configuration is that the printed circuit board acts as a barrier to airflow which could otherwise be used to cool the motor and its associated electronic components, including the printed circuit board itself.

The present invention discloses a motor construction having an improved airflow path that overcomes the problems found in the prior art in a convenient and cost-efficient manner.

SUMMARY OF THE INVENTION

The present invention is directed to a switched reluctance motor that creates an improved airflow path for cooling motor components in an efficient manner. The motor includes a support frame having an upper and lower frame, a stator having among other components four stator poles formed of multiple laminations, and a rotor having a shaft and four rotor poles formed of multiple laminations. The rotor is mounted for rotation within the stator, which is secured to the support frames. A centrifugal fan mounted to the motor shaft is also provided for circulating air through the motor to keep the motor cool during operation. A rotary position encoder mounted to the shaft beneath the centrifugal fan is further provided for determining the speed, direction, and position of the motor rotor.

In one aspect of the present invention, the electrical functions are divided between an upper and a lower circuit board. The upper circuit board is secured to the upper frame in one horizontal plane perpendicular to the rotor, and the lower circuit board is secured to the upper frame in another horizontal plane. The centrifugal fan is mounted within an opening formed in the upper circuit board and is disposed above the lower circuit board. This construction allows the airflow to pass across both the upper and lower circuit boards to thereby dissipate any heat that may be generated by these devices. The airflow is also directed across sidewalls which are part of the support frame. These sidewalls act as a heat sink for electronic power devices secured to the sidewalls and connected to the upper circuit board. The airflow assists in removing heat generated by the electronic power devices.

The present invention also provides an additional pair of centrifugal fans that are disposed above and below the rotor laminations. These devices direct the airflow across the rotor, stator and stator coils thereby cooling these devices and expelling the air out of ports formed in the support frame. The centrifugal fan disposed above the rotor laminations expels the air from the flow path created by the centrifugal fan mounted within the opening in the upper circuit board. The centrifugal fan disposed below the rotor laminations creates an independent flow path which passes in through and out through ports in the lower frame.

In another aspect of the present invention, a method for creating an airflow path through an electric motor is provided. The method includes the step of drawing air into the motor by rotating a fan which is connected to the rotor. The airflow is then directed across a pair of circuit boards or other planar surfaces, thereby dissipating any heat generated by these devices. The airflow is then directed across a heat sink area to which electronic power devices have been attached, thereby dissipating any heat generated by these devices. Finally, the airflow is expelled out of the motor through multiple ports formed in the motor support frame.

BRIEF DESCRIPTION OF THE DRAWINGS

Other aspects and advantages of the present invention will become apparent upon reading the following detailed description and upon reference to the drawings in which.

DETAILED DESCRIPTION OF ILLUSTRATIVE EMBODIMENTS

Figure 1:
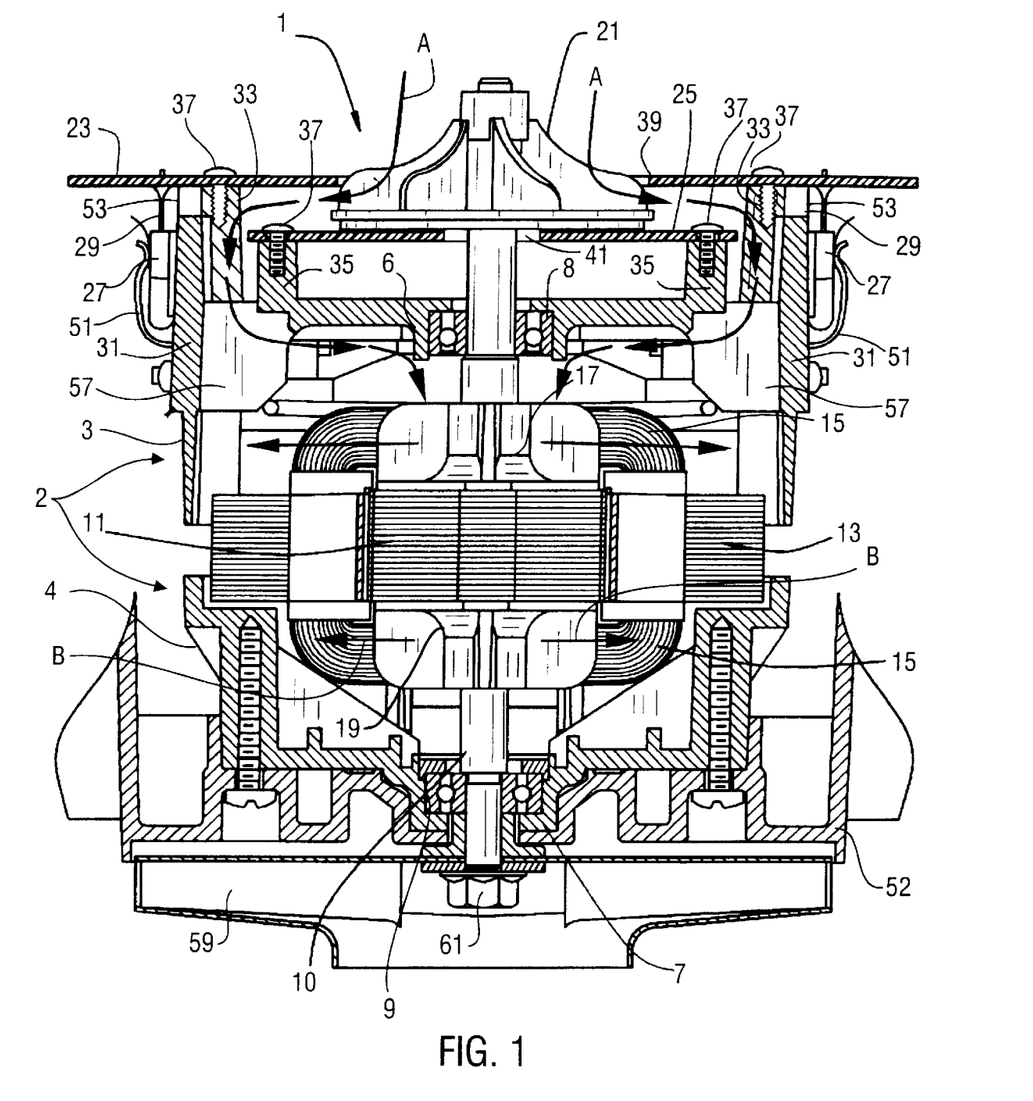
FIG. 1 is a cross sectional view of a switched reluctance motor embodying the present invention.
Figure 2:
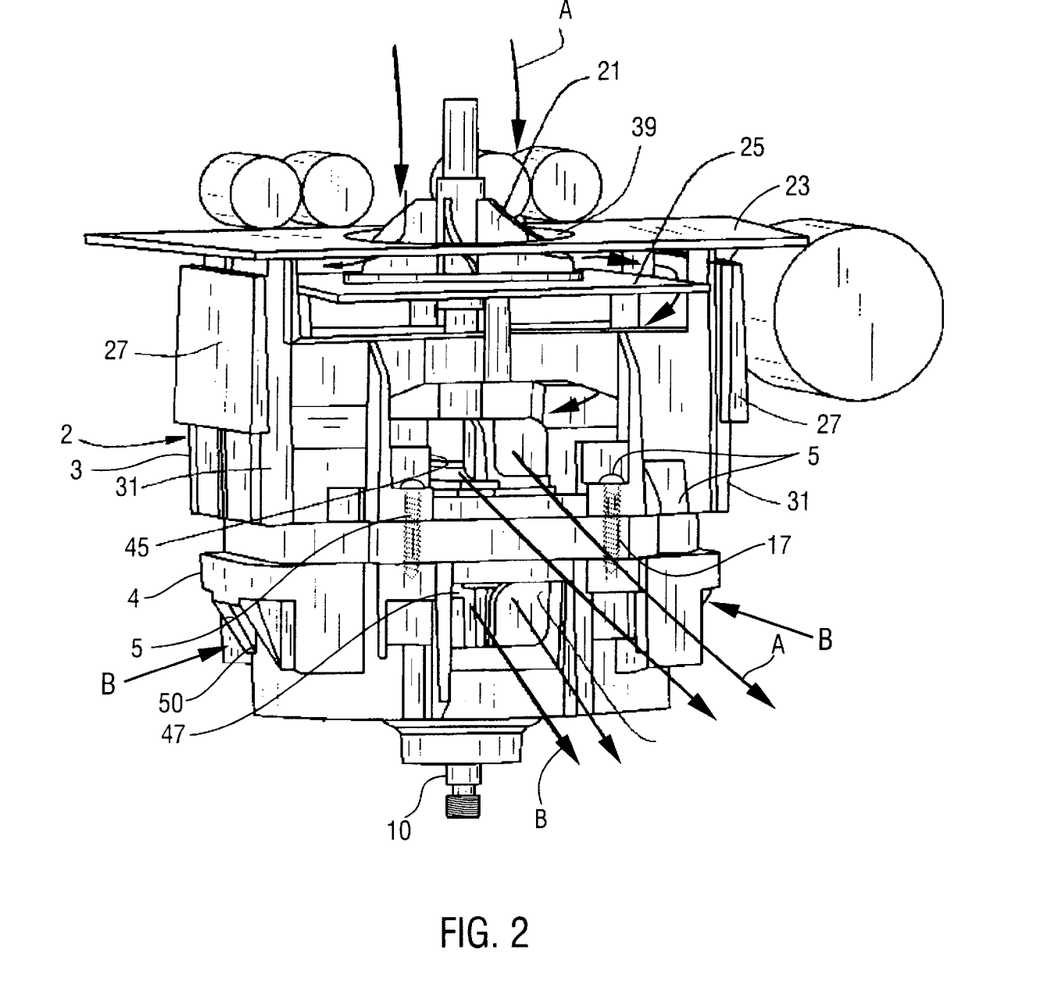
FIG. 2 is a perspective view of the switched reluctance motor of FIG. 1, illustrating the airflow path of the present invention, with the electrical power devices and spring clamps removed for clarity.
Figure 3:
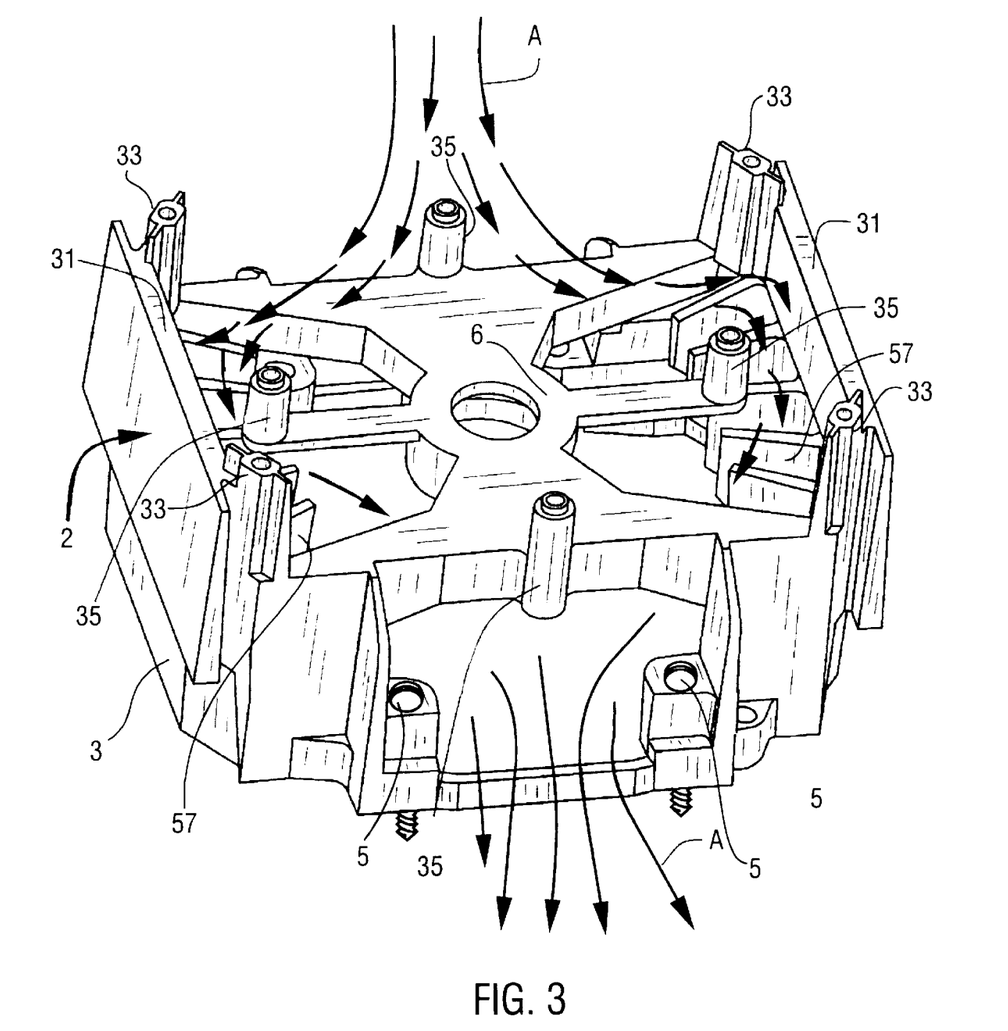
FIG. 3 is a top perspective view of the upper frame of the switched reluctance motor according to the present invention without the printed circuit boards attached, illustrating the airflow path of the present invention.

Turning now to the drawings and referring initially to FIG. 1, a switched reluctance motor 1 according to the present invention is shown. The motor 1 includes a pair of support frames 2 comprising an upper frame 3 and a lower frame 4. The upper frame 3 and the lower frame 4 are attached to one another with fastening means, such as screws 5, as shown in FIGS. 2 and 3. The frame 2 is provided with upper and lower bearing retaining housings 6 and 7, formed in the upper and lower frames 3 and 4, respectively. The upper and lower bearing retaining housings 6 and 7 house bearings 8 and 9, which are provided to support a motor shaft 10 in the frame 2 and allow the shaft 10 to rotate relative to the frame. Part of a vacuum housing 52 and a impeller 59 which are connected to motor 1 are also visible from the perspective of FIG. 1.

Figure 4:
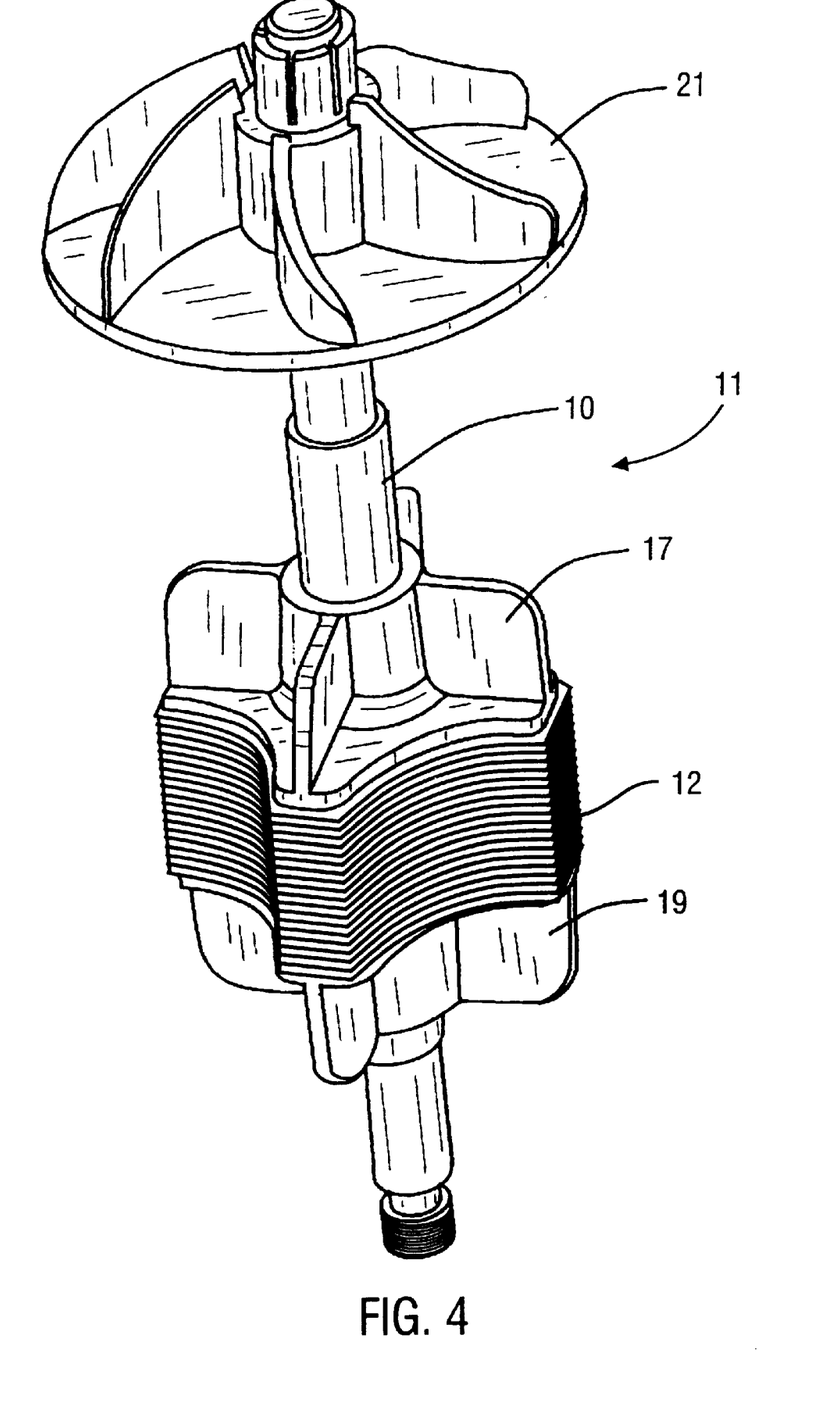
FIG. 4 is a perspective view of the rotor assembly and attached centrifugal fans according to the present invention.

A rotor 11 having four equally-spaced rotor poles, which is formed of a series of similarly constructed stacked laminations 12, is mounted to the motor shaft 10, as best seen in FIG. 4. The rotor 11 rotates within a stator core 13, which is also formed of a series of similarly constructed stacked laminations. Stator coils 15 are wound around the stator core 13, as shown in FIG. 1. When energized by an external power source, the stator coils 15 induce an electromagnetic force that causes the rotor 11 to rotate, as is known to those of ordinary skill in the art.

The motor 1 further includes centrifugal fans 17 and 19, which are mounted to the rotating motor shaft 10. The centrifugal fans 17 and 19 are mounted above and below the rotor laminations 12, respectively, as best seen in FIG. 4. These devices force heated air out of the motor 1, as shown in FIGS. 1 and 2, thereby cooling the rotor 11, stator 13 and stator coils 15. A centrifugal fan 21 is also provided, and is mounted to the upper end of the rotating motor shaft 10, as shown in FIGS. 1, 2 and 4. As the centrifugal fan 21 rotates with the shaft 10, it forces cool air into the motor 1, as shown in FIGS. 1 and 2. The centrifugal fan 21 cooperates with the centrifugal fan 17 to generate an airflow path through the motor 1 that cools the motor in accordance with the present invention, as further described below.

In accordance with the design of the present invention, the control circuitry is divided between two separate circuit boards, an upper printed circuit board 23 and a lower printed circuit board 25, which are interconnected by wires or separable connectors. The upper circuit board 23 contains a plurality of devices including the electronic power devices 27 which generate substantial amounts of heat during operation. The electronic power devices 27 are secured in close thermal contact to the upper frame 3 at sidewalls 31 with spring clamps 51, as shown in FIG. 1. The sidewalls 31 act as heat sinks dissipating the substantial amount of heat generated by the electronic power devices 27 away from the devices, thus improving their electrical characteristics and reliability. The sidewalls 31 may also be corrugated, for example, with cooling fins 57 (best seen in FIG. 3), as is consistent with typical heat sink designs. The sidewalls 31 are cooled by the circulating air generated by the improved cooling design according to the present invention.

The lower circuit board 25 contains the control portion of the motor circuitry, such as integrated circuits and related parts which do not generate enough heat to require attachment to a heat sink.

The upper circuit board 23 is supported on the top of the upper frame 3 by frame supports 33. The lower circuit board 25 is disposed below the upper circuit board 23 and is supported on the upper frame 3 by cylindrical frame supports 35. The upper and lower circuit boards 23 and 25 are secured to the frame supports 33 and 35, respectively, by suitable fastening means, such as screws 37, as shown in FIG. 1. The ends of supports 33 and supports 35 terminate at different heights so that the circuit boards 23 and 25, when attached, will appear in different planes within the upper frame 3. FIG. 3 shows the frame supports 33 and 35 with their associated circuit boards removed for clarity.

A circular opening 39 is formed in the upper circuit board 23 to accommodate the centrifugal fan 21, as shown in FIG. 2. The opening 39 also provides an inlet for cool air to flow into the motor 1. A smaller opening 41 is provided in the lower circuit board 25 to accommodate the rotating motor shaft 10, as shown in FIG. 1.

Figure 5:
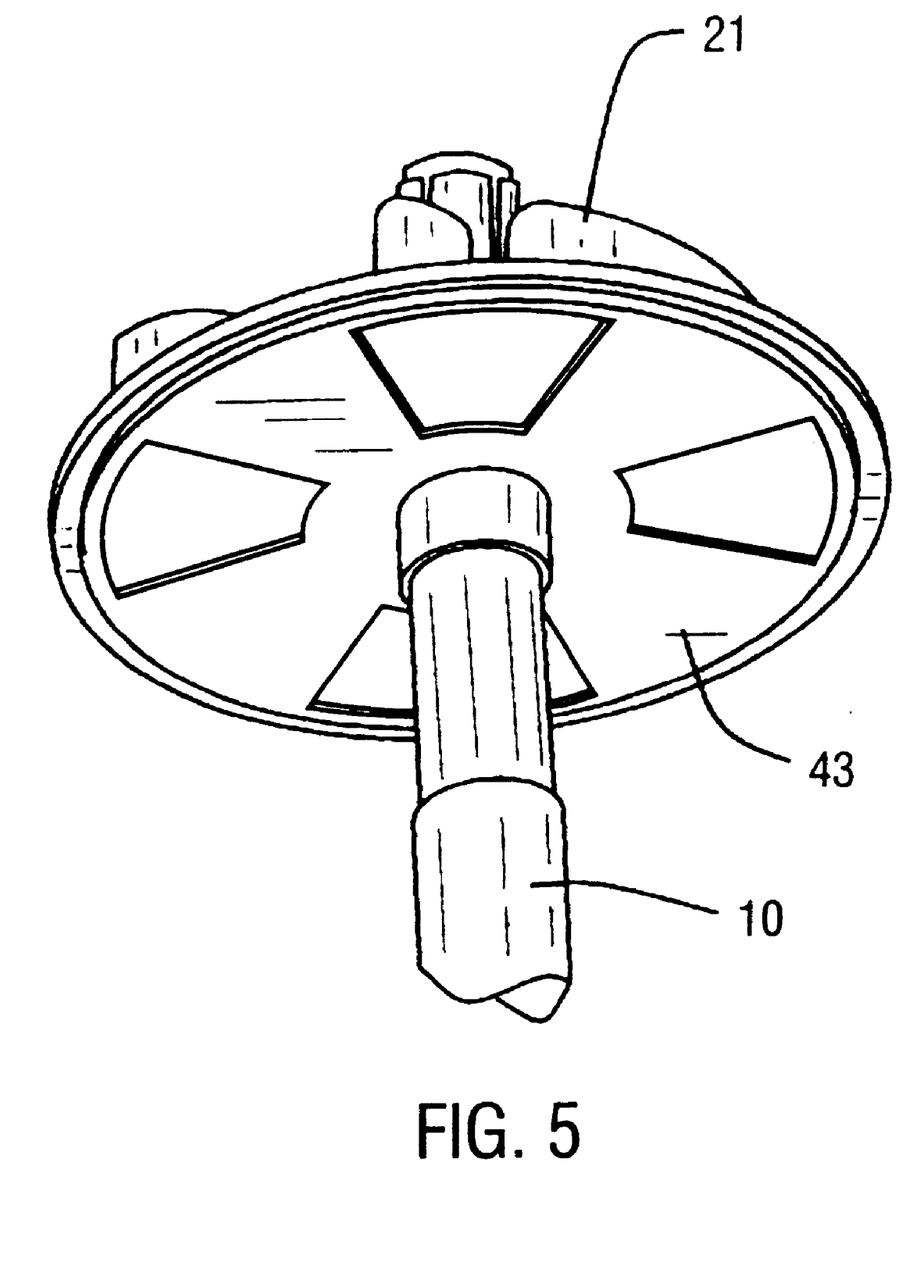
FIG. 5 is a bottom perspective view of the top-most centrifugal fan and the rotary position encoder attached to the motor shaft.

A rotary position encoder 43 is mounted beneath the centrifugal fan 21, as shown in FIG. 5. The rotary position encoder 43 is spaced in close proximity to the lower circuit board 25 to monitor the position and speed of the rotor 11 relative to the stator 13. Encoding is known to those of skill in the art and is only briefly described here. First, copper pads are etched onto lower circuit board 25 which have traces connected to a motor controller integrated circuit (not shown) also mounted on board 25. Rotary position encoder 43 is similarly formed of copper pads, as shown in FIG. 5, fixed on a suitable substrate such as a circuit board. When the rotary position encoder 43 rotates in close proximity to the lower circuit board 25, a signal is capacitively coupled between the copper pads on the rotary position encoder 43 and the copper pads on the lower circuit board 25, the capacitance being greater when the pads are aligned, and lower when the pads are staggered. Thus, when the rotary position encoder 43 rotates over the lower circuit board 25, an oscillating capacitively induced signal is produced which is interpreted by the motor controller integrated circuit to determine rotor position and speed. One of ordinary skill will realize that a similar encoding arrangement could be adapted using optical, magnetic, or inductive sensing means, all of which are well known in the art. It should also be noted that rotary position encoder 43 could consist of a conductive pattern integral with the centrifugal fan 21, such as a hot stamped foil or printed pattern.

Motor 1 is preferably assembled according to the general outline that follows. One of ordinary skill will generally know the specifics of how to assemble a motor 1 such as that disclosed herein, and furthermore, will realize that many of the assembly steps as disclosed may be performed in a different order or in slightly different ways. First, the rotor assembly as shown in FIG. 4 is assembled (at this point, without centrifugal fan 21). Next, the stator assembly, including winding the stator coils 15 around the stator core 13, is formed. Then, the circuit boards 23 and 25 are screw-connected to the upper frame 3. Next, bearings 9 are inserted into the lower frame 4, and the completed rotor assembly is slipped therethrough. A nut 61 fastens the shaft 10 (and, for example, impeller 59) to the underside of the lower frame 4. Next, the completed stator assembly is slipped into place around the rotor assembly and into lower frame 4. Then, bearings 8 are inserted in the upper frame 3, the upper portion of the rotor assembly is fed therethrough. Next, the upper frame 3, lower frame 4, and the stator assembly are fastened together with screws 5, and the stator coils 15 are connected to the appropriate leads on the upper circuit board 23. Next, the centrifugal fan 21, complete with rotary position encoder 43, is slipped though hole 39 in the upper circuit board 23 (the hole 39 should be made just slightly larger than the diameter of the fan 21), and is press-fitted onto the rotor shaft 10. Additionally, a spring clamp can be used to further secure the fan 21 (preferably plastic) onto the rotor shaft 10.

The foregoing construction contains several advantages over the prior art. First, the rotary position encoder 43 is connected directly to the bottom of a centrifugal cooling fan 21. This advantageously combines the functions of cooling and encoding into one part. Second, the separation of the printed circuit board into upper and lower circuit boards 23 and 25 creates an airflow path through which air can be guided by the centrifugal fans 17 and 21 through the motor 1. This not only facilitates cooling the internal components of the motor 1 but it also facilitates cooling the circuit boards 23 and 25 themselves. Most importantly, the power devices 27 attached to the upper circuit board 23 are also cooled by the air flow path. Also, one of ordinary skill will realize that other structures could be used in place of circuit boards 23 and 25 to provide the air cooling path described. For example, metallic or plastic plates or any other suitable member could be used. Such plates could be planar or non-planar depending on the shape and direction of the desired airflow path within the motor 1.

Referring to FIG. 1, the airflow path A according to the present invention is shown. The rotation of shaft 10 causes the centrifugal fan 21 to turn, thus drawing air into the motor 1 through the circular opening 39 in the upper circuit board 23. As the air flows radially outward from the centrifugal fan 21, it passes along the underside of the upper circuit board 23. This flow cools the upper circuit board 23 and thus prevents it from overheating. As the air flows in this direction, it also passes over the upper surface of the lower circuit board 25 thus cooling the lower circuit board. Next, and most importantly, the air flows along the sidewalls 31 thereby cooling the sidewalls and keeping the electronic power devices 27 from overheating. The centrifugal fan 17 draws the airflow back toward the center of the rotor 11 and redirects it across the upper portion of the rotor 11, stator 13, and stator coils 15, thereby cooling these components, and then out ports 45 formed in the side of support frame 2, as shown in FIGS. 1 and 2.

To further assist in cooling the motor components, the centrifugal fan 19, mounted below the rotor laminations 12, creates an independent airflow path B. As shown in FIGS. 1 and 2, airflow path B enters the lower frame 4 at side ports 50 and is directed across the lower portion of the rotor 11, stator 13, and stator coils 15, thereby cooling these components. Airflow path B exits the lower frame 4 at ports 47. By the use of these two air paths, more than just the electronic power devices 27 and upper and lower circuit board 23 and 25 are cooled. The rotor 11, stator 13, and the stator coils 39 are also cooled, thereby improving their performance and reliability.

To form an efficient airflow path A, it is necessary to patch any "leaks" which would otherwise exist in the path. To accomplish this, a film 53 or some other sealing means is installed between the upper circuit board 23, and the sidewalls 31, as shown in FIG. 1. Preferably, the film 53 is a polyimide (e.g., Kapton™) film which insulates the power devices 27 from the heat sink and provides a suitable airflow seal. Because the electronic power devices 27 are mounted on only two sides of the upper frame 3, a suitable foam or insulation paper (not shown) can be used to seal the gaps between the upper circuit board 23 and the upper frame 3 on the other two sides (i.e., the non-heat sink sides) of the upper frame 3.

Those skilled in the art who now have the benefit of the present disclosure will appreciate that the present invention may take many forms and embodiments and have many uses. For example, the present invention can be used on other electronically commutated motors as well. It is intended that the embodiments described herein should be illustrative only, and not limiting of the present invention. Rather, it is intended that the invention cover all modifications, equivalents and alternatives falling within the spirit and scope of the invention as defined by the appended claims.

What is claimed is:
1. An electric motor, comprising:
    (a) a stator having a plurality of stator poles;
    (b) a rotor having a shaft and a plurality of rotor poles, said rotor being rotatably disposed within said stator, said rotor being supported by a support frame defining sidewalls;
    (c) at least one fan mounted to the shaft for directing an airflow into said motor through an entrance port; and
    (d) a circuit board disposed within said motor in proximity to said entrance port and said sidewalls, such that airflow is directed radially over said circuit board in a first direction generally transverse to an axis defined by the shaft, and then in a direction along said sidewalls generally parallel to the axis defined by the shaft to dissipate heat generated by electronic components associated with said circuit board.
2. The electric motor as defined in claim 1, further comprising a capacitive encoder having a first conductive pattern and a second conductive pattern, said circuit board having a ground plane, said first conductive pattern rotatably disposed about said shaft of said rotor in close proximity to said circuit board, said second conductive pattern disposed on said circuit board in close proximity to said first conductive pattern, wherein said first and second conductive patterns are capacitively coupled to said ground plane of said circuit board to determine the speed and position of the rotor.
3. The electric motor as defined in claim 2, wherein the circuit board contains an opening through which said shaft of said rotor is disposed, said first conductive pattern of said capacitive encoder is concentrically arranged about said shaft, and said second conductive pattern of said capacitive encoder is concentrically arranged about said opening in said circuit board.
4. The electric motor as defined in claim 1, wherein the fan is a centrifugal fan.
5. The electric motor as defined in claim 1, said circuit board further directing said airflow across a heat sink area within said motor to which electronic power devices have been attached, thereby dissipating heat generated by said electronic power devices.
6. The electric motor as defined in claim 1 and further, comprising:
    at least one fan mounted on one side of the rotor poles for directing a first portion of said airflow radially past said stator; and
    at least one fan mounted on the other side of the rotor poles for directing a second portion of said airflow radially past said stator.
7. An electric motor, comprising:
    (a) a stator having a plurality of stator poles;
    (b) a rotor having a shaft and a plurality of rotor poles, said rotor being rotatably disposed within said stator;
    (c) at least one fan mounted to the shaft, which circulates air through the motor to keep the motor cool during operation; and
    (d) at least two circuit boards, at least one that is disposed beneath the at least one fan, and at least another that is disposed in the same plane as the at least one fan, and wherein said at least one fan forces air across the at least two circuit boards.
8. A method for creating an airflow path through an electric motor to cool said motor, the motor having a rotor including a shaft and a stator, said method comprising the steps of:
    (a) directing a first airflow into the motor by rotating a fan which is connected to the shaft;
    (b) directing said first airflow in a first direction generally transverse to an axis defamed by the shaft, radially over at least one circuit board;
    (c) directing said first airflow in a second direction generally parallel to the axis defined by the shaft, over a heat sink area having electronic power devices coupled thereto; and
    (d) expelling the air out of the motor through at least one port.
9. The method for creating an airflow path as defined in claim 8, further comprising the step of directing the air across the rotor and stator, thereby dissipating any heat generated by said devices before the air is expelled out of the motor.
10. The method for creating an airflow path as defined in claim 9, further comprising the step of creating a second airflow path that is directed across the rotor and stator to further dissipate any heat generated by said devices.

11. The method for creating an airflow path as defined in claim 10, wherein the step of creating the second airflow path is performed by rotating another fan connected to the rotor.

12. A rotor position and speed detection assembly for use in an electric motor, comprising:
   (a) a rotor having a shaft;
   (b) a first fan mounted to the shaft for directing an airflow into an inlet aperture of said electric motor;
   (c) a circuit board having a ground plane, said circuit board disposed within said motor proximate said inlet aperture for directing said airflow radially across said circuit board to cool electronic components associated with said circuit board; and
   (d) a capacitive encoder including a first conductive pattern rotatably disposed about said shaft proximate said circuit board and a second conductive pattern disposed on said circuit board proximate said first conductive pattern, said first and second conductive patterns capacitively cooperating with said ground plane of said circuit board to determine the speed and position of the rotor.

13. The rotor position and speed detection assembly as defined in claim 12, wherein the first fan is a centrifugal fan.

14. The rotor assembly as defined in claim 12, wherein the first conductive pattern of said capacitive encoder is mounted to a surface of said first fan facing said circuit board.

15. The rotor position and speed detection assembly as defined in claim 12, further comprising a plurality of rotor poles that are mounted to the shaft.

16. The rotor assembly as defined in claim 14, including a second fan mounted on one side of the rotor poles for directing a portion of said airflow radially past said stator, and a third fan mounted on the other side of the rotor poles for directing a portion of said airflow radially past said stator.

17. A method for creating an airflow path through an electric motor having a frame, a rotor, and a stator coil, said method comprising the steps of:
   (a) directing a first airflow into at least one first port on the frame through the use of a first fan mounted to the rotor;
   (b) directing said first airflow radially over at least one circuit board, thereby dissipating heat generated by electronic components associated with said at least one circuit board;
   (c) directing said airflow past at least a portion the stator coil and out of the motor through at least one second port on the side of the frame; and
   (d) directing a second airflow into at least one third port on the side of the frame through the use of a second fan mounted to the rotor, past at least a portion of the stator coil and out of the motor through at least one fourth port on the side of the frame.

18. The method defined in claim 17, wherein at least one of the first and second fans is a centrifugal fan.

19. A combination motor encoding and cooling apparatus for attachment to a motor rotor, comprising:
   (a) a fan disposed proximate an entrance port of a motor for directing an airflow into the interior of said motor;
   (b) a circuit board disposed within said motor proximate said entrance port, said circuit board having a ground plane; and
   (c) a capacitive encoder including a first conductive pattern attached to the fan and a second conductive pattern disposed on said circuit board in spaced relation to said first conductive pattern;
   whereby said airflow is directed radially past said circuit board to thereby dissipate heat generated by electronic components associated with said circuit board, and said first and second conductive patterns are capacitively coupled to said ground plane of said circuit board to determine motor speed, rotor direction, and rotor position.

20. The combination motor encoding and cooling apparatus as defined in claim 19, wherein the fan is a centrifugal fan.

21. An electric motor, comprising:
   (a) a stator having a plurality of stator poles;
   (b) a rotor having a shaft and a plurality of rotor poles, said rotor being rotatably disposed within said stator;
   (c) at least one fan mounted to the shaft for directing an airflow into said motor through an entrance port;
   (d) a circuit board disposed within said motor in proximity to said entrance port for directing said airflow radially over said circuit board to dissipate heat generated by electronic components associated with said circuit board; and
   (e) a capacitive encoder having a first conductive pattern and a second conductive pattern, said circuit board having a ground plane, said first conductive pattern rotatably disposed about said shaft of said rotor in close proximity to said circuit board, said second conductive pattern disposed on said circuit board in close proximity to said first conductive pattern, wherein said first and second conductive patterns are capacitively coupled to said ground plane of said circuit board to determine the speed and position of the rotor.

22. An electric motor, comprising:
   (a) a stator having a plurality of stator poles;
   (b) a rotor having a shaft and a plurality of rotor poles, said rotor being rotatably disposed within said stator;
   (c) a fan mounted to the shaft for directing an airflow into said motor through an entrance port, wherein at least a portion of the fan extends through the entrance port; and
   (d) a circuit board disposed within said motor in proximity to said entrance port for directing said airflow radially over said circuit board to dissipate heat generated by electronic components associated with said circuit board.

23. An electric motor, comprising:
   (a) a stator having a plurality of stator poles;
   (b) a rotor having a shaft and a plurality of rotor poles, said rotor being rotatably disposed within said stator;
   (c) a first fan mounted to the shaft on a first side of the rotor for directing a first airflow into said motor through an entrance port;
   (d) a circuit board disposed within said motor in proximity to said entrance port for directing said first airflow radially over said circuit board to dissipate heat generated by electronic components associated with said circuit board; and
   (e) a second fan mounted on the first side of the rotor poles for directing said first airflow radially past said stator.

24. The electric motor as defined in claim 23, futher comprising a third fan mounted on a second side of the rotor poles for directing a second airflow radially past said stator.

* * * * *

UNITED STATES PATENT AND TRADEMARK OFFICE
CERTIFICATE OF CORRECTION

PATENT NO. : 6,011,331
DATED : January 4, 2000
INVENTOR(S) : Joseph T. Gierer, Karmen D. Cox It is certified that error appears in the above-identified patent and that said Letters Patent is hereby corrected as shown below:

Column 6, line 51 (Claim 8, line 8) "defamed" should be -- defined --.

Signed and Sealed this

First Day of August, 2000

Attest:

Q. TODD DICKINSON

*Attesting Officer*          *Director of Patents and Trademarks*